United States Patent
Gwertzman et al.

(10) Patent No.: US 6,189,000 B1
(45) Date of Patent: Feb. 13, 2001

(54) SYSTEM AND METHOD FOR ACCESSING USER PROPERTIES FROM MULTIPLE STORAGE MECHANISMS

(75) Inventors: James Gwertzman, Seattle; William Paul Allan McDaniel, Bellevue, both of WA (US)

(73) Assignee: Microsoft Corporation, Redmond, WA (US)

( * ) Notice: Under 35 U.S.C. 154(b), the term of this patent shall be extended for 0 days.

(21) Appl. No.: 08/885,254

(22) Filed: Jun. 30, 1997

(51) Int. Cl.⁷ .................................................... G06F 17/30
(52) U.S. Cl. .................... 707/1; 707/3; 707/10; 707/200; 705/26; 709/203
(58) Field of Search ............................. 707/1, 3, 10, 200; 705/26; 709/203

(56) References Cited

U.S. PATENT DOCUMENTS

| | | | |
|---|---|---|---|
| 5,465,365 | * | 11/1995 | Winterbottom ....................... 395/600 |
| 5,560,005 | * | 9/1996 | Hoover et al. ....................... 707/10 |
| 5,608,903 | * | 3/1997 | Prasad et al. ....................... 395/610 |
| 5,623,601 | * | 4/1997 | Vu ....................................... 395/187.01 |
| 5,627,996 | * | 5/1997 | Bauer .................................. 395/500 |
| 5,724,575 | * | 3/1998 | Hoover et al. ....................... 707/10 |
| 5,740,422 | * | 4/1998 | Foltz et al. ............................ 395/609 |
| 5,765,154 | * | 6/1998 | Horikiri et al. ........................ 707/10 |
| 5,771,384 | * | 6/1998 | Remington et al. ................. 395/683 |
| 5,778,174 | * | 7/1998 | Cain .................................. 395/187.01 |
| 5,794,039 | * | 8/1998 | Guck .................................... 395/683 |
| 5,806,057 | * | 9/1998 | Gormley et al. ........................ 707/1 |
| 5,806,068 | * | 9/1998 | Shaw et al. ........................... 707/103 |
| 5,815,415 | * | 9/1998 | Bentley et al. ....................... 364/578 |
| 5,819,285 | * | 10/1998 | Damico et al. ....................... 707/104 |
| 5,826,242 | * | 10/1998 | Montulii .............................. 705/27 |
| 5,832,505 | * | 11/1998 | Kasso et al. ......................... 707/104 |

* cited by examiner

*Primary Examiner*—Hosain T. Alam
*Assistant Examiner*—Jean Bolte Fleurantin
(74) *Attorney, Agent, or Firm*—Klarquist Sparkman Campbell Leigh & Whinston LLP

(57) ABSTRACT

A system and method is disclosed for accessing properties used to customize network documents to a user. In one aspect of the system and method, an application developer may obtain user properties that are stored on multiple storage mechanisms by using a single logical name, which is a user-friendly name of a data structure on one of the storage mechanisms. The user-friendly name makes it faster and easier for an application developer to create applications. The user-friendly name also frees the application developer from having to determine the location of the storage mechanisms on the network.

24 Claims, 5 Drawing Sheets

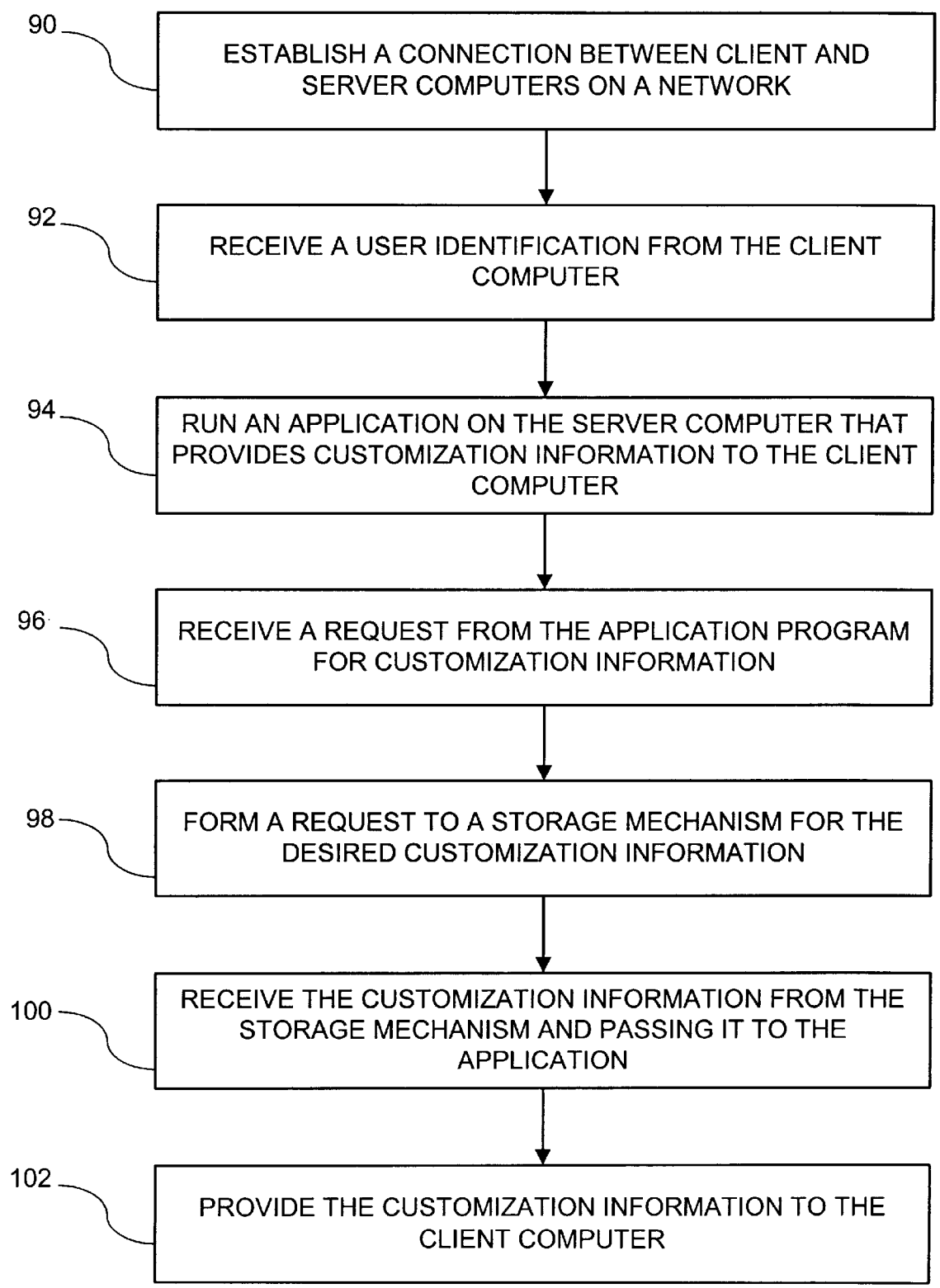

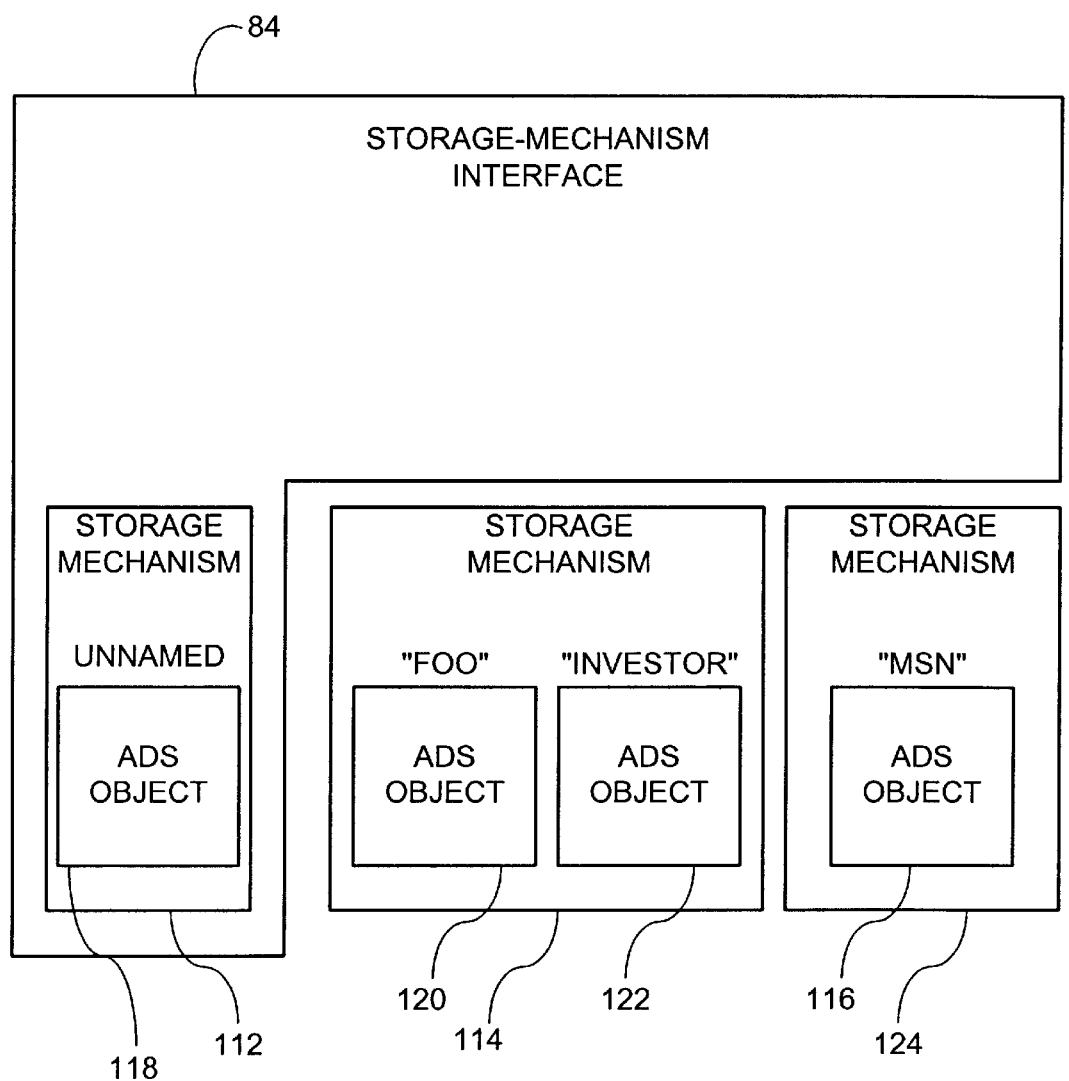

SYSTEM AND METHOD FOR ACCESSING USER PROPERTIES FROM MULTIPLE STORAGE MECHANISMS

FIELD OF THE INVENTION

This invention relates generally to storage mechanisms on a computer network, such as an Internet or Intranet network, and, in particular, to providing a common interface for accessing user properties stored on the storage mechanisms.

BACKGROUND AND SUMMARY OF THE INVENTION

The Internet is a well-known, global network of cooperatively interconnected computer networks. The World-Wide Web portion of the Internet is a collection of server computers (referred to as "sites") that store documents which are typically accessible by the public. The Intranet uses similar protocols and has a similar user interface to the Internet. The Intranet, however, restricts access to a network by users outside of a defined group, such as users who are not employees of a corporation. Hereinafter, any description of the Internet also is applicable to Intranet, unless otherwise specified.

Software, generally known as "browsers," is now in wide-spread use for retrieving (also known as "downloading") documents (also known as "Web pages") from the World-Wide Web and viewing such documents in hyper-text markup language (HTML) format. These HTML documents generally include text, HTML "tags" that specify the format of a document, and links (referred to as "hyper-links") that point to related documents on the network and other files containing information (e.g., sound, images, video, etc.) to be combined into the document. In use, browser software allows a user to navigate (also known as "browse") between documents and sites on the World-Wide Web.

Software object components also may be used with the HTML documents for displaying executable content, such as for animations or information processing. Currently, most Internet browsers support embedded software object components in the form of ActiveX controls, Java applets, and scripts (e.g., VB scripts and Java scripts).

Many sites store information relating to a user's browsing characteristics, such as what links the user activated, how often the user accesses the site, and how long the user remained on a particular Web page. These characteristics may be used to display content that is customized for that particular user, rather than displaying generic content that is displayed to all users. Customized information also may be directly entered by the user. For example, a document may be displayed to the user having customization options relating to news, sports, entertainment, etc. Based on the options the user selects, the document only displays content related to those selected options. Moreover, the site stores the user-selected options so that the customization information is re-displayed when the user re-accesses the same document at a later time.

Such customization information is often stored in data structures (e.g., objects) on different storage mechanisms located on a network. Such storage mechanisms have different formats for storing data and different protocols or commands for accessing the data within the data structures.

Application developers write applications that use the storage mechanisms to present customization information to a user. But to write such applications, the developer must determine what storage mechanism the information is stored on, how the user is identified on that storage mechanism, and what commands that storage mechanism uses for providing the desired information. Obviously, the more storage mechanisms used in the system, the more difficult it is for the application developer to keep track of the particular nuances for accessing data on each storage mechanism.

Additionally, each storage mechanism or each data structure on a storage mechanism has its own schema. A schema defines the properties that are available on a particular storage mechanism or data structure. Thus, an application developer may have to search several schemas to find a desired property.

To overcome the aforementioned shortcomings, a system and method is provided for freeing an application developer from having to determine where a storage mechanism containing a desired user property is located on the Internet network and how to identify the user for that storage mechanism.

In one aspect of the invention, an application developer may obtain user properties by using a logical name, which is a user-friendly name, associated with the location of the property. For example, a property may be stored in a data structure having a full path name LDAP://ldap1/o=microsoft/ou=members/ou=MicrosoftNetwork. Rather than using this full path name, the application developer may access the data structure using a logical name called "MSN." These user-friendly names make it faster and easier for an application developer to create applications. The user-friendly name also frees the developer from having to identify or worry about the particular path name where the storage mechanism is stored.

When a request for a user property is received from an application, the logical name is used as a key to access a database entry. The database entry includes the location or path name of a data structure containing the desired property. A request is then constructed for accessing the user property, and once the user property is obtain from the data structure, it is passed back to the application.

In another aspect of the invention, an application developer is provided access to a schema that is an aggregation of schemas from the various storage mechanisms on the network. The aggregated schema makes it easier for an application developer to determine the user properties that are available and where such user properties are stored on the network.

The schema concept is similar to a Unix-based system called a "mount" process where a single, virtual file system can be built out of multiple, actual storage mechanisms. Typically, in Unix, a single configuration file describes each of the mechanisms and where such mechanisms fit into the overall file system namespace. In Unix, however, all the storage mechanisms store information in a similar format. The present invention, on the other hand, allows an application developer to access multiple storage mechanisms that store information in different formats.

In yet a further aspect of the invention, the storage mechanisms may be cross-linked so that information obtained from one storage mechanism can be used to access information on another storage mechanism. Such cross-linking can be used for grouping users together so that each user in the group has a property that is common to all members of the group.

Additional features and advantages of the invention will be made apparent from the following detailed description of an illustrated embodiment which proceeds with reference to the accompanying drawings.

BRIEF DESCRIPTION OF THE DRAWINGS

FIG. 4 is a flow diagram of a method for displaying customization information using the storage-mechanism interface of FIG. 3.

FIG. 6 is a detailed block diagram of the storage-mechanism interface and storage mechanisms of FIG. 3.

DETAILED DESCRIPTION OF AN EMBODIMENT

Overview of Client and Server Computers

Figure 1:
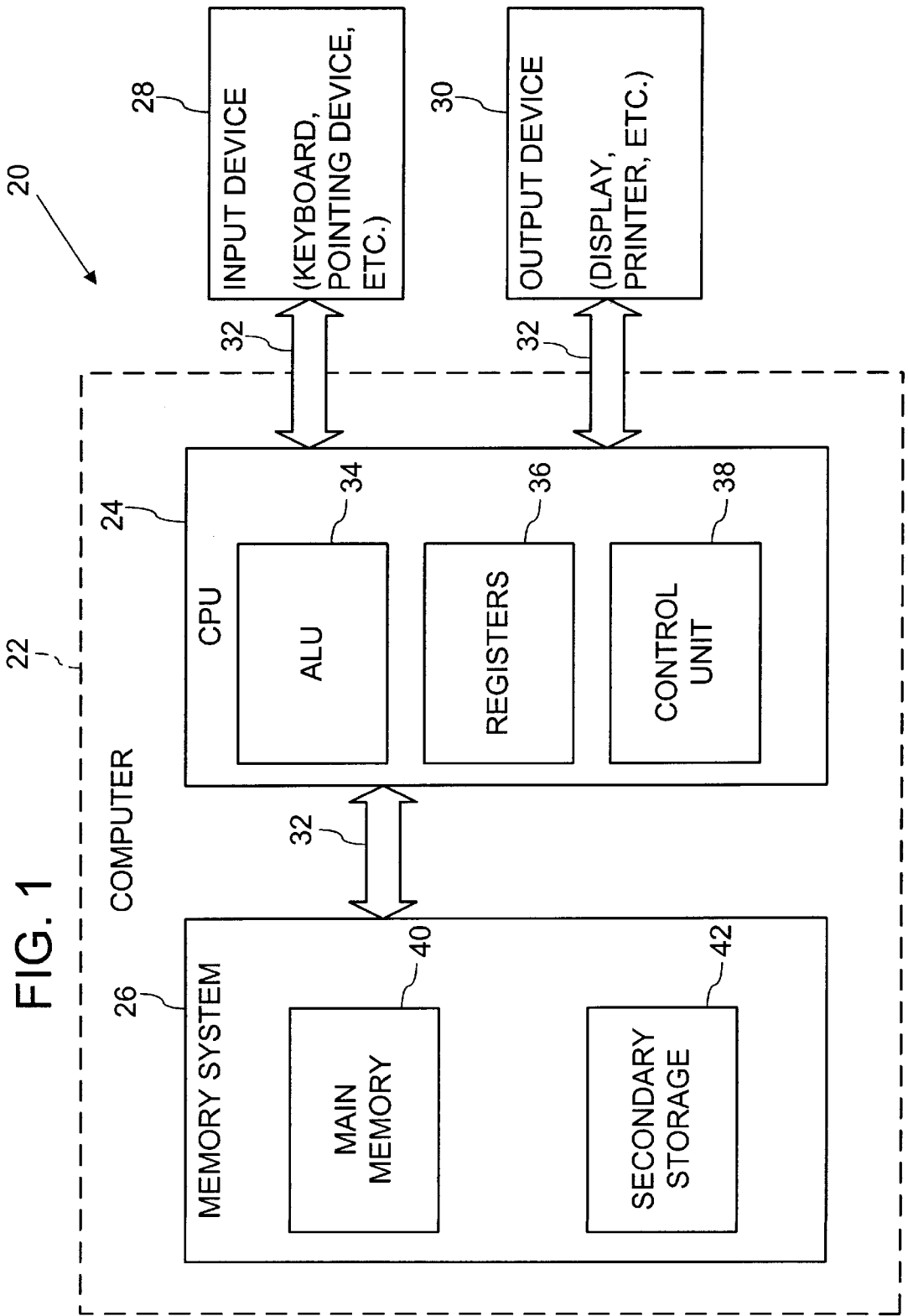
FIG. 1 is a block diagram of a computer system used to implement a method and apparatus embodying the invention.

Referring to FIG. 1, an operating environment for an illustrated embodiment of the present invention is a computer system 20 with a computer 22 that comprises at least one high speed processing unit (CPU) 24, in conjunction with a memory system 26, an input device 28, and an output device 30. These elements are interconnected by at least one bus structure 32.

The CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPc from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28, 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26. Preferably, the operating system employs a graphical user interface where the display output of an application program is presented in a rectangular area (sometimes referred to as a "Window") on the screen of the output device 30 and is also multi-tasking, such as Microsoft Corporation's Windows® 95 or Windows® NT operating system, IBM's OS/2 Warp operating system, Apple's Macintosh System 7 operating system, X-Windows, etc.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Browsing Environment Overview

Figure 2:
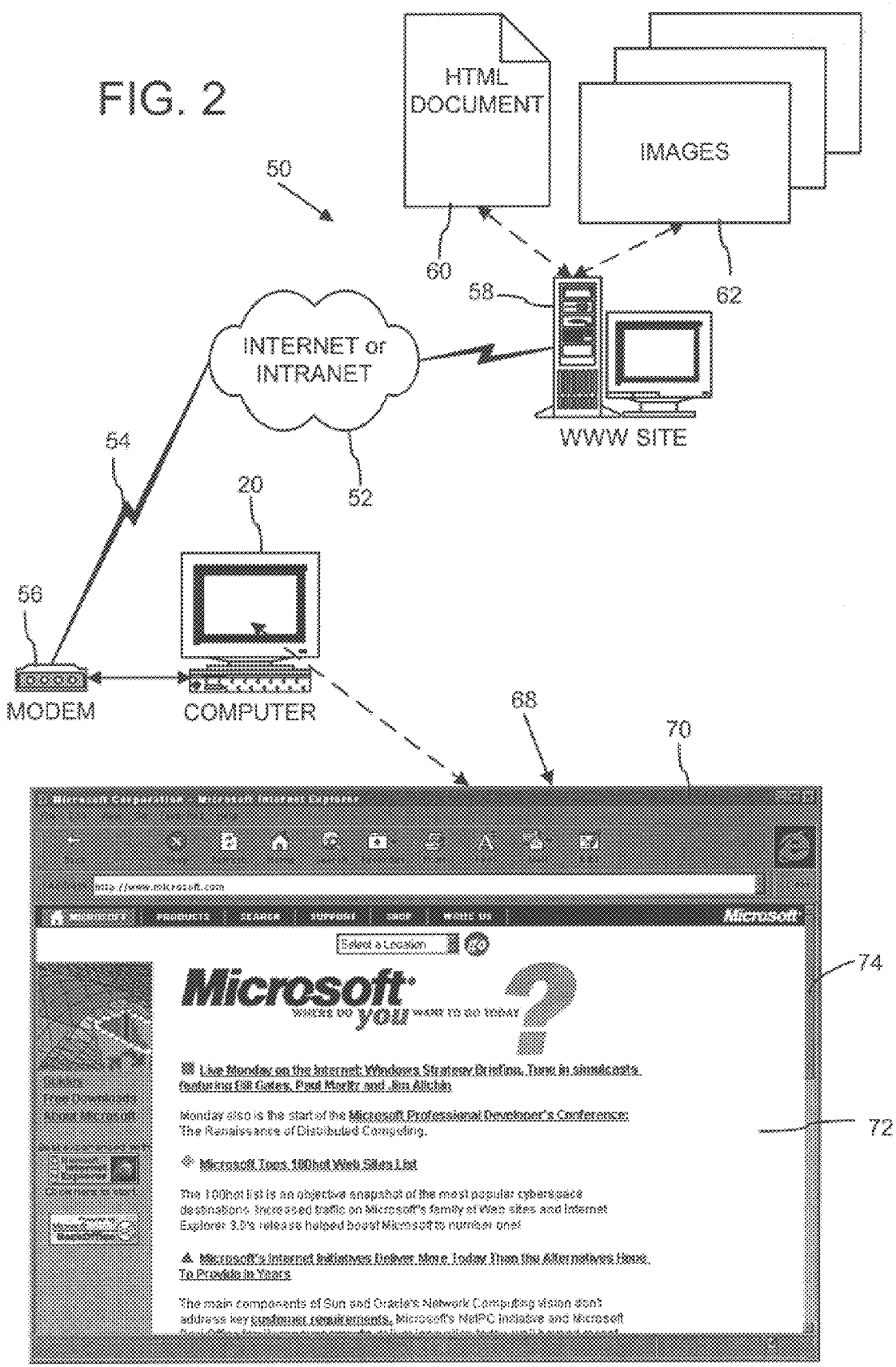
FIG. 2 is a known browser environment on a client computer for connecting to and interacting with a server computer over a remote computer network, such as the Internet or Intranet.

FIG. 2 shows a browsing environment 50 in which computer 20 (FIG. 1) as a client runs software, referred to herein as a "browser," for unified browsing of electronic documents and other data from local sources (e.g., the secondary storage 42 of FIG. 1) and from a remote computer network 52. The browser can be integrated with the operating system software, or can be separate application software. The remote computer network 52 may be the Internet or the Intranet. In the browsing environment 50, the computer 20 connects to the computer network 52 over a telephone line 54 with a modem 56. Other physical connections to the computer network alternatively can be used, such as an ISDN, T1 or like high speed telephone line and modem, a television cable and modem, a satellite link, an optical fiber link, an Ethernet or other local area network technology wire and adapter card, radio or optical transmission devices, etc. The invention can alternatively be embodied in a browsing environment for other public or private computer networks, such as a computer network of a commercial on-line service or an internal corporate local area network (LAN), an intranet, or like computer network.

Documents for browsing with the browser can reside as files of a file system stored in the computer's secondary storage 42 (FIG. 1), or reside as resources at a remote computer 58 (also referred to as a "site" or server) connected to the computer network 52, such as a World-Wide Web site on the Internet. The document 60 residing at the site 58 conforms with HTML standards, and may include extensions and enhancements of HTML standards. However, the browser also can browse documents having other data formats (e.g., Microsoft® Word documents, etc.) from the computer 20 or remote computer 58. In conformance with HTML, the document 60 can incorporate other additional information content 62, such as images, audio, video, executable programs, etc. (hereafter simply "images" 62), which also reside at the remote computer 58. The document 60 and images 62 preferably are stored as files in a file system of the remote computer 58. The document 60 incorporates the images 62 using HTML tags that specify the location of files or other Internet resource containing the images on the Internet 52.

When used for browsing documents, the browser displays the document in a window 68 or rectangular area of the computer's display 30 allocated to the browser by the operating system. The window 68 comprises a frame 70, a document display area 72, and user interface controls 74. The browser displays the document within the document display area 72 of the window 68.

Client Identifier

When the client computer 20 connects to the server 58, a token, such as a globally unique identifier (GUID) and/or a user identification, is assigned to the client and stored locally as a client identifier (not shown), often called a "cookie." The client identifier is generally arbitrary text information (e.g., of up to 255 characters) returned to user client 20 by server 58 when it is accessed by user client 20. The information includes the GUID and/or user identification and one or more network addresses (e.g., Uniform Resource Locators, URLs) indicating servers that the user accessed using the browser. Such information is stored in the client identifier on client 20. On subsequent accesses of any of the specified network addresses by the browser on user client 20, selected information in the client identifier is returned to server 58. A benefit of using a client identifier to carry the information is that it is automatic and transparent to the user.

The particular technique for identifying the client is not of importance to the invention. Using a GUID is only one possible way to identify the client. Other techniques may of course be used. For example, there is a proposal in the industry for an Open Privacy Standard (OPS), which defines how clients are identified.

Figure 3:
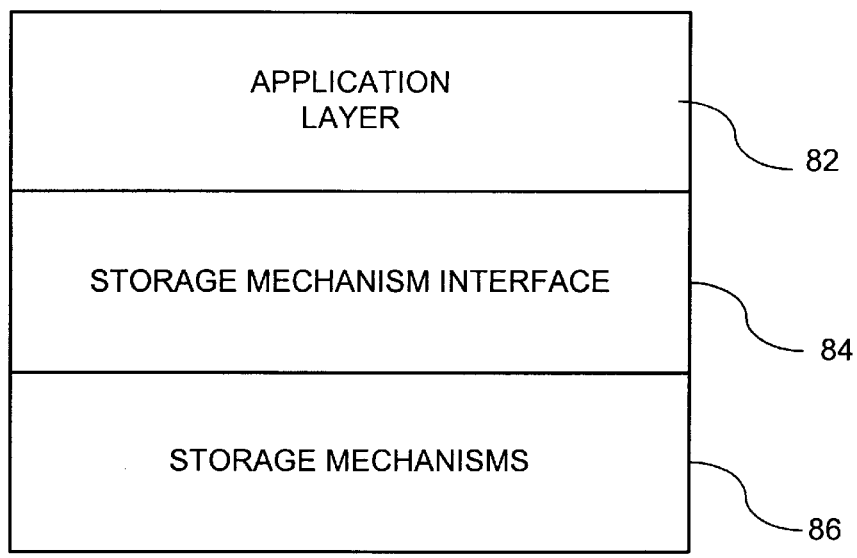
FIG. 3 is a block diagram of a system architecture including a storage-mechanism interface for providing customization information to the client computer of FIG. 2.

System Architecture for Providing Customization Information to the Client Computer FIG. 3 shows a system architecture 80 on site 58 for storing customization information for a user and for running applications that provide the customization information to the user. The system includes an application layer 82, a storage-mechanism interface 84, and a plurality of storage mechanisms 86. The application layer 82 includes applications that can be written in any number of languages known in the art. For example, the application can be written in an interpreted language, such as a Java applet or a Visual Basic script that runs on a scripting host. Alternatively, the application can be written in a compiled language, such as an object oriented language (e.g., C++). The application layer 82 is traditionally responsible for identifying the user and loading the user's properties directly from the storage mechanisms to display customization information to the user. But different storage mechanisms access data using different protocols and identify the user using different schemes, which makes it difficult for the application developer to create a simple, easy-to-read applications.

To resolve this problem, the system architecture 80 according to the present invention inserts the storage-mechanism interface 84 between the application layer 82 and the storage mechanisms 86 to provide a standard interface to all of the storage mechanisms. The storage-mechanism interface 84 effectively aggregates all of the user properties on the storage mechanisms into a common property namespace. Consequently, the application developer only needs to write commands for interfacing with the storage-mechanism interface, rather than the different storage mechanisms. The storage-mechanism interface 84 supports an Active Directory Service interface, as is further described below, but other interfaces can be used. A detailed overview of the Active Directory Service Interface is attached in Exhibit A and is generally available on the Internet at Microsoft.com.

Storage mechanisms 86 that store customization information are well known in the art and include a Lightweight Directory Access Protocol (LDAP) database or an Open Database Connector (ODBC) database. Other databases or other types of storage mechanisms may of course be used, such as memory system 26 or secondary storage 42.

FIG. 4 is a flow diagram that shows how the system architecture 80 of FIG. 3 can be used to provide customization information to a user on client computer 20. Process block 90 indicates that the client computer 20 establishes a connection with the server 58 through the computer network 52. Such a connection is typically accomplished through a browser.

Process block 92 indicates that the client computer 20 passes a user identification to the server 58 using a cookie. The user identification can either be a GUID, a username entered by the user, or other means for identifying the user on client computer 20. Although the invention describes using a cookie, other techniques for transferring information can be used, such as WWW-authenticate as defined by HTTP.

Process block 94 indicates that an application in application layer 82 executes or interprets a command requesting a user property from a storage mechanism 86. The application needs this information to provide customization information to the user. For example, the user may receive a personalized document that states the user's name or their favorite sports team.

Process block 96 indicates that the storage-mechanism interface 84 receives the request for customization information from the application. The application developer need not worry about the proprietary nuances associated with an underlying storage mechanism containing the user property. For example, the request does not need to include the location of the storage mechanism on the system. Instead, the storage-mechanism interface 84 provides a uniform interface to access the storage mechanisms 86.

Process block 98 indicates that the storage-mechanism interface 84 forms a request to the storage mechanism for the desired user property. The location of the storage mechanism, which includes a path name, is identified and a request is constructed to that storage mechanism including any proprietary nuances that storage mechanism may have.

Process blocks 100 and 102 indicate that the storage-mechanism interface 84 receives the user property from the storage mechanism and passes it back to the requesting application. The application then uses the user property to provide customization information to the user.

Storage-mechanism Interface Overview

Figure 5:
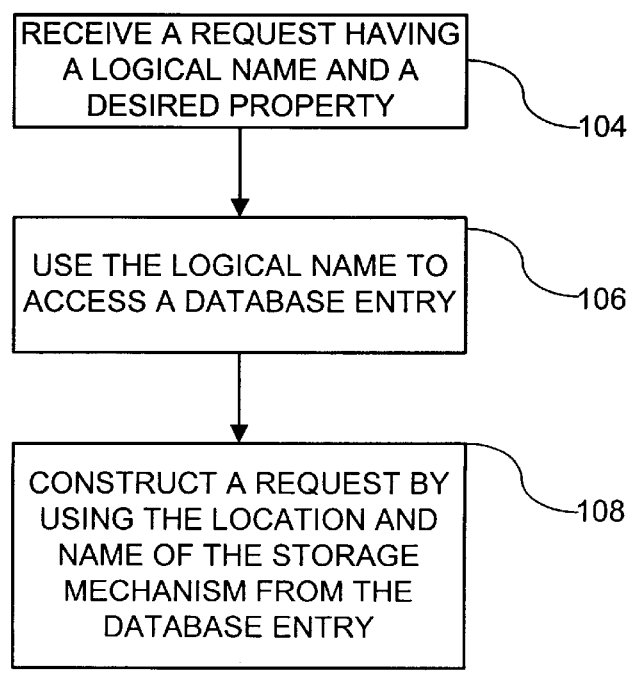
FIG. 5 is a detailed flow diagram for accessing customization information stored on storage mechanisms using the storage-mechanism interface.

FIG. 5 shows an overview of how the storage-mechanism interface 84 constructs a request to the storage mechanisms 86. Process block 104 indicates that the application request includes a property name and a logical name of a storage mechanism. The logical name is a user-friendly name that is provided to the application developer, through authoring or scripting tools, as is further described below. The storage mechanisms typically contain one or more data structures (e.g., objects) that store the user properties. The logical name is typically associated with a data structure containing a desired property and uniquely identifies that data structure. For example, instead of having to indicate a path to the storage mechanism and the actual name of the data structure, the application developer needs only to call the data structure a logical name (e.g., "foo") and the storage-mechanism interface takes care of properly locating and identifying the storage mechanism and the data structure (i.e., providing the actual name of the data structure). The logical name can also be used to identify the storage mechanism rather than a data structure.

Process block 106 indicates that the logical name in the request is used as a key to accessing a database entry. The database entry includes a field indicating the path name to the storage mechanism associated with the logical name and the actual name of the data structure containing the desired property. Additionally, the database entry includes a field containing a user identity for that storage mechanism or containing a property, as is further described below.

Process block 108 indicates that the storage-mechanism interface 84 constructs a request to the storage mechanism 86. This is accomplished by appending the user identification to the end of the path name. Some storage mechanisms use a different user identification scheme than other storage mechanisms. Thus, the user identification received from the web server or application may be a logical user identification which needs to be modified to obtain the actual user identification. The storage-mechanism interface takes care of converting the logical user identification to the actual user identification needed for the storage mechanism. The storage-mechanism interface then sends the constructed request to the storage mechanism.

Detailed Implementation of Storage-Mechanism Interface

FIG. 6 shows a more detailed block diagram of the storage-mechanism interface 84 and the storage mechanisms 86. The storage mechanisms 86 are shown generally as three separate storage mechanisms 112, 114, and 116. Each storage mechanism contains one or more objects, such as objects 118, 120, 122 and 124. The objects are set up into a hierarchical system of objects where object 118 is a root object and objects 120, 122, and 124 are leaf objects. The storage-mechanism interface 84 is derived from an Active Directory service (ADS) interface and the objects 118, 120, 122 and 124 support the ADS interface. Any number of objects and storage mechanisms may be used in the system. Additionally, other types of interfaces may be used other than the ADS interface.

The objects are denoted with their respective logical names. For example, object 120 is called a generic name "foo," object 122 is called "investor" and object 124 is called "MSN." Any desired logical name can be used. The root object remains unnamed. Thus, if an application request does not include a logical name, the root object is chosen by default.

The storage-mechanism interface 84 allows a server containing multiple user objects with different names located on multiple storage mechanisms to map such objects into a single, hierarchical namespace. Thus, the application developer only needs to write commands in a format compatible with the storage-mechanism interface, rather than for each of the storage mechanisms individually.

Each object contains a schema, which identifies the properties included within that object. For example, if the object "foo" includes the actual phone numbers of users, the schema object may include an element saying "Phone numbers" to indicate to an application developer that such information is available to access. The storage-mechanism interface also maps the schemas into a single, aggregated schema space. So to the application developer, there is only one schema containing all of the properties available on the server. The application developer uses authoring tools to view the aggregated schema. All of the properties for all of the storage mechanisms are thereby displayed for the application developer. The application developer can select a property desired and is presented with the logical name of the data structure containing that property.

The storage-mechanism interface is a COM object and is created using CoCreateInstance. Creation of the storage-mechanism interface can be accomplished manually by execution of a command in an application or can be done automatically (e.g., by a scripting host). The object is initialized by reading in configuration information defined in table 1, shown below.

TABLE 1

Class ObjectInfo : public IDispatch
{
BSTR Name;
BSTR ADSPath;
BSTR Schema;
BSTR Class;
BSTR Container;
WORD Suffix; // 0 = nothing, 1 = username, 2 = property
BSTR DepObject;
BSTR DepProp;
BSTR BindAsName;
BSTR BindAsPassword;

Most of the configuration fields shown in table 1 are discussed in the ADS specification. In general, the Name field is a logical name. The ADSPath field is a prefix that is combined with the suffix field to create the full path name or the relative path name (i.e., the actual name) to the desired property on a storage mechanism.

The Container field is a full path name telling the storage-mechanism interface where to create objects if the objects do not already exist.

The DepObject and DepProp field are used to instantiate a second object using information obtained from a first, already instantiated object. This can be used for grouping properties. For example, a corporate Web site may provide a different background color to a user when the user accesses the site. The user may be put into a group, wherein all users in the group are presented with the same background color. Each user in the group inherits properties for that group, like the background color. Thus, group properties are created by mapping in a group user from one storage mechanism based on an ADS object from another storage mechanism. This cross-linking between storage mechanisms allows the group property to be changed at one location in order to change the properties for multiple users within the group.

The BindAsName and BindAsPassword field are used to tell the storage-mechanism interface the user credentials and passwords that are authentic for a particular storage mechanism. Without proper authentication, the requesting application cannot access the storage mechanism containing the desired user property. This authentication process is carried out by the storage-mechanism interface and is transparent to the application developer. The storage-mechanism interface has a precedence for using binding information. First, the storage-mechanism interface looks to the script for binding information. If the script does not provide such information, the storage-mechanism interface looks to the configuration file for the binding information. If the binding information is not available in the configuration file, then the storage-mechanism interface uses the user information passed from the client to the web server. If this is also not available, the storage-mechanism interface requests information anonymously. An example BindAs function is as follows:

HRESULT BindAs([in] BSTR bszObjectName, [in] BSTR bszUserName, [in] BSTR bszPassword);

Initialization of the storage-mechanism interface is accomplished through an Init function and an OnStartPage function. Example routine calls for these functions are as follows:

```
HRESULT Init([in]BSTR bszInstanceId, [in] BSTR
    bszUserDN);
HRESULT OnStartPage (IScriptingContext
    *pContext).
```

For the Init routine, bszInstanceId is the virtual server identification and bszUserDN is the username. The OnStartPage function is called by a scripting host when first running a script. To properly initialize, the storage-mechanism interface receives the virtual server identification and the user's identification from a host in the scripting environment. Non-host applications can call Init and provide the virtual server identification and the user's identification.

A SetUserName function indicates the global user credentials passed from the client computer. A sample function is as follows:

```
HRESULT SetUserName([in] BSTR bszUserName);
```

A GetObject function is used by an application to obtain an ADS object containing a user property. An example Getobject request is as follows:

```
GetObject("", "MSN").Get("prop")
```

In this case "MSN" is the logical name of an object and "prop" is the property desired from that object. Upon receiving this request for a property, the storage-mechanism interface searches through the configuration information for a match between the logical name "MSN" and the Name field in the configuration information. Upon finding a match, the prefix ADSPath is combined with the suffix to construct a proper request to the storage mechanism for the desired object. As explained in relation to DepObject and DepProp, in some cases the suffix may be a property from another object. In that case, the storage-mechanism interface obtains the property from the other object and uses that property to instantiate the desired object.

The general format of the GetObject function is as follows:

```
HRESULT GetObject ([in]BSTR bstrClass, [in]BSTR
    bstrRelativeName, [out, retval]IADS **ppNamedObject)
```

BSTR bstrClass is typically a NULL character, and BSTR bstrRelativeName is a user-friendly name of a storage mechanism containing a user property.

The storage-mechanism interface can improve performance by using a broker which acts as a cache. If and when a client requests the same object stored in the broker, the storage-mechanism interface can obtain the object from the broker. If this broker request fails for any reason, then the object can be instantiated directly. An example configuration file is as follows:

```
[]
ADSPath=LDAP://ldap1/o=microsoft/ou=members
Schema=LDAP://ldap1/o=microsoft/ou=schema/cn=user
Class=user
Container=LDAP://ldap1/o=microsoft/ou=members
Suffix=username
DepObject=
DepProp=
BindAsName=
BindAsPassword=
[msn]
ADSPath=LDAP://ldap1/o=microsoft/ou=members/ou=msn
Schema=ldap://upwbldap01/schema/MsnUser
Class=msnuser
Suffix=username
DepObject=
DepProp=
BindAsName=
BindAsPassword=
[investor]
PreADspath=LDAP://ldap2/o=microsoft/ou=members/ou=investor
Schema=LDAP://ldap2/o=microsoft/ou=schema/cn=InvestorUser
Class=InvestorUser
Suffix=property
DepObject=
DepProp=AnonID
BindAsName=
BindAsPassword=
```

The configuration file is shown with three database entries. The first database entry is for a root directory since the name field is a NULL. The second and third database entries have name fields of "MSN" and "investor," respectively.

A sample Visual Basic script for inserting user properties into an HTML page on a server is as follows:

```
Set User = Server.CreateObject("u2.UserObjects")
REMFetch a root property
Response.Write(User.Prop)
Response.Write(User.GetObject ("").Prop)
REM Fetch an MSN property
Response.Write (User.GetObject ("","msn").Prop)
REM Fetch an Investor property
Response.Write(User.GetObject ("","investor").Prop)
```

Having illustrated and described the principles of the invention in a preferred embodiment, it should be apparent to those skilled in the art that the embodiment can be modified in arrangement and detail without departing from such principles.

For example, although the system and method is described as using a logical name that is associated with an object on a storage mechanism, instead the logical name may be a property. In that case, the storage-mechanism interface would search the configuration file for a match with the logical name. The configuration information can then have a field indicating the actual name and location of the storage mechanism containing that property.

Additionally, although the storage-mechanism interface was shown running applications on the server computer, it also may be used to run applications on the client computer.

Furthermore, although the invention is primarily described for inserting user properties into HTML pages, other formats may be used such as the Channel Description Format (CDF).

Still further, although the invention is described in relation to a specific server having specific function names, other servers with similar functions may be used.

In view of the many possible embodiments to which the principles or invention may be applied, it should be recognized that the illustrated embodiment is only a preferred example of the invention and should not be taken as a limitation on the scope of the invention. Rather, the invention is defined by the following claims. We therefore claim as the invention all such embodiments that come within the scope of these claims.

We claim:

1. A method of accessing storage mechanisms on a network having server and client computers, comprising the steps of:
   providing multiple storage mechanisms that store user properties in different formats and that require different commands for accessing user properties;
   receiving a request from an application for a user property stored on one of the storage mechanisms, the request including a logical name associated with the storage mechanism;
   the request having the same format regardless of which of the multiple storage mechanisms the user property is stored on;
   using the logical name to access a database entry containing a location of the storage mechanism;
   constructing a request to the storage mechanism for the user property using the location of the storage mechanism from the database entry; and
   providing a schema for each storage mechanism, the schemas defining properties stored on the storage mechanisms and aggregating the schemas into a single schema defining substantially all of the properties on the storage mechanisms.

2. The method of claim 1 wherein the location of the storage mechanism includes a path name to the storage mechanism and the constructing step includes appending a user identification to the path name.

3. The method of claim 1 wherein the storage mechanism includes multiple data structures for storing user properties and the logical name uniquely identifies a data structure containing the user property.

4. The method of claim 1 further including obtaining a logical user identification associated with the user and wherein the database entry includes a field having the actual user identification.

5. The method of claim 1 further including:
   after constructing a request for the user property, receiving the user property from the storage mechanism;
   returning the user property to the application; and
   using the user property to display customization information to the user.

6. The method of claim 1 wherein the application is executed on the client computer.

7. The method of claim 1 wherein the application is executed on the server computer.

8. The method of claim 1 wherein the network is an Internet network or an Intranet network.

9. The method of claim 1 wherein the storage mechanism is a first storage mechanism and the database entry includes a pointer to a property located on a second storage mechanism.

10. The method of claim 9 further including accessing the property of the second storage mechanism and using that property to access the first storage mechanism.

11. The method of claim 1 wherein the storage mechanism is a first storage mechanism and the method further includes providing a second storage mechanism and cross-linking the first and second storage mechanisms so that information obtained from the first storage mechanism can be used to access information on the second storage mechanism.

12. The method of claim 1 wherein the logical name is a name of the user property and the database entry includes the path name of the storage mechanism containing that user property.

13. The method of claim 1 further including dynamically adding a storage mechanism to the network and automatically updating the aggregated schema to reflect properties associated with the added storage mechanism.

14. A method of accessing multiple storage mechanisms on a network having server and client computers, comprising the steps of:
   providing a first storage mechanism having a first data structure for storing user properties;
   providing a second storage mechanism having a second data structure for storing user properties;
   mapping the first and second data structures into a single, user property space so as to provide a common format for accessing the user properties in the first and second data structures;
   providing a schema for each of the first and second storage mechanisms, the schemas defining properties stored on the storage mechanisms; and
   aggregating the schemas into a single schema defining substantially all of the properties on the storage mechanisms.

15. The method of claim 14 including receiving a logical name associated with the first data structure and using the logical name as a key to accessing a database entry.

16. The method of claim 15 including obtaining an actual name of the first data structure and constructing a request to the first data structure for a user property.

17. The method of claim 14 further including dynamically adding a storage mechanism to the network and automatically updating the aggregated schema to reflect properties associated with the added storage mechanism.

18. A system for providing customization information to a user, comprising:
   a server computer including first and second data structures located on first and second storage mechanisms, respectively, the data structures including multiple user properties;
   the first and second data structures having different path names to access the user properties;
   a client computer having a display for displaying customized information to a user;
   a communication network for coupling the server computer and the client computer for allowing communication therebetween;
   means for mapping the first and second data structures into a single data structure comprising the multiple user properties, said means allowing access to the user properties in the first and second data structure without specifying the path name of the data structures;
   means for providing a schema for each storage mechanism wherein the schemas define the property stored on the storage mechanisms; and
   means for aggregating the schemas into a single schema defining substantially all of the properties on the storage mechanisms.

19. The method of claim 18 further including dynamically adding a storage mechanism to the network and automatically updating the aggregated schema to reflect properties associated with the added storage mechanism.

20. A method of obtaining user properties from disparate storage mechanisms on a computer network, the method comprising the steps of:

establishing a connection over the computer network between a client computer and a server computer;

receiving a user identification associated with a user on the client computer;

running a command in an application running on either the client or server computers, the command including a logical name for an object located on a storage mechanism and a desired user property for display on the client computer;

accessing a database entry using the logical name in the command as a key, the database entry including a first field identifying the storage mechanism associated with the logical name and a second field specifying the format for accessing data on the storage mechanism using the user identification wherein the first and second fields are not user defined;

constructing a request to the storage mechanism by combining the first and second fields;

receiving the user property from the storage mechanism and passing it to the application;

providing customization to the client computer based on the user property;

providing a schema for each storage mechanism, the schemas defining the properties on the storage mechanisms; and aggregating the schemas into a single schema defining substantially all of the properties on the storage mechanisms.

21. The method of claim 20 further including dynamically adding a storage mechanism to the network and automatically updating the aggregated schema to reflect properties associated with the added storage mechanism.

22. A method of accessing storage mechanisms on a network, comprising the steps of:

providing multiple storage mechanisms that have different path names for accessing the storage mechanisms;

the multiple storage mechanisms storing user properties and requiring different commands for accessing the user properties;

receiving a first request for a user property that includes a logical name, but that does not include the path name of a storage mechanism containing the user property or the commands needed to access the storage mechanism;

using the logical name to look up both a path name for the storage mechanism that contains the user property and the user property in that storage mechanism;

providing a schema for each storage mechanism, the schemas defining the properties on the storage mechanisms; and aggregating the schemas into a single schema defining substantially all of the properties on the storage mechanisms.

23. The method of claim 22 further including:

within a computer other than a computer sending the first request, constructing a second request to the storage mechanism for the user property by identifying a proper path name and commands needed to access a user property associated with the logical name.

24. The method of claim 22 further including adding a storage mechanism to the network and automatically updating the aggregated schema to reflect properties associated with the added storage mechanism.

* * * * *